United States Patent
Anderson et al.

(10) Patent No.: US 6,209,842 B1
(45) Date of Patent: Apr. 3, 2001

(54) LAMINATED DAMPING DEVICE FOR A CARRIER

(75) Inventors: Dale H. Anderson, Tucson, AZ (US); Donald M. Connelly, Jr.; Kenton C. Green, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/085,856

(22) Filed: May 27, 1998

(51) Int. Cl.$^7$ ................................................. F16M 13/00
(52) U.S. Cl. ......................... 248/560; 248/562; 248/634; 248/638; 312/223.1; 312/223.2; 312/334.36
(58) Field of Search ...................... 248/638, 634, 248/562, 560; 312/223.2, 223.1, 334.36

(56) References Cited

U.S. PATENT DOCUMENTS

| | | | |
|---|---|---|---|
| 2,815,252 | * 12/1957 | Baker | 308/3.6 |
| 3,079,277 | 2/1963 | Painter . | |
| 3,276,762 | 10/1966 | Thomas . | |
| 3,456,939 | * 7/1969 | Duchemin | 267/47 |
| 3,730,509 | * 5/1973 | Jorn | 267/152 |
| 4,278,726 | * 7/1981 | Wieme | 248/638 |
| 4,683,520 | 7/1987 | Grassens et al. . | |
| 4,924,976 | * 5/1990 | Bernett | 267/141 |
| 5,131,619 | 7/1992 | Daugherty et al. . | |
| 5,214,549 | 5/1993 | Baker et al. . | |
| 5,217,198 | 6/1993 | Samarov et al. . | |
| 5,275,371 | * 1/1994 | Brian et al. | 248/638 |
| 5,332,306 | * 7/1994 | Babb et al. | 312/223.1 |
| 5,337,998 | * 8/1994 | Nemoto | 248/634 |
| 5,358,210 | 10/1994 | Simon et al. . | |
| 5,390,891 | 2/1995 | Hornung et al. . | |
| 5,422,767 | * 6/1995 | Hatchett | 360/98.01 |
| 5,469,311 | 11/1995 | Nishida et al. . | |
| 5,548,480 | 8/1996 | Rudi et al. . | |
| 5,557,499 | * 9/1996 | Reiter et al. | 312/223.2 |
| 5,564,802 | * 10/1996 | Chiou | 312/223.1 |
| 5,566,049 | 10/1996 | Nguyen . | |
| 5,579,204 | 11/1996 | Nelson et al. . | |
| 5,796,585 | * 8/1998 | Sugiyama et al. | 312/223.2 |

FOREIGN PATENT DOCUMENTS

| | | |
|---|---|---|
| 61-13485 | 1/1986 | (JP) . |
| 4-54337 | 2/1992 | (JP) . |
| 4-171326 | 6/1992 | (JP) . |
| WO 97/06532 | 2/1997 | (WO) . |

* cited by examiner

*Primary Examiner*—Leslie A. Braun
*Assistant Examiner*—Debbie Short
(74) *Attorney, Agent, or Firm*—David Lynch; Steven Funk (57) ABSTRACT

A damping device with a top element, a bottom element, and a viscoelastic element between the top and bottom elements. The damping device exerts significant shear displacement across the viscoelastic element upon deflecting. The damping device may have first and second ends and an intermediate portion between the first and second ends. The damping device may have a generally longitudinal extension with an elevation in the direction of the top element in the intermediate portion. The elevation may have a substantially V-shape when the damping device is unloaded. A system in accordance with the principles of the present invention including a system cabinet, a plurality of carriers mounted in the system cabinet for receiving hard disk drives, and a plurality of damping devices according to the invention mounted between the carriers and the system cabinet.

7 Claims, 8 Drawing Sheets

LAMINATED DAMPING DEVICE FOR A CARRIER

BACKGROUND OF THE INVENTION

1. Field of the Invention

This invention relates in general to carriers, and more particularly to a laminated damping device for a common carrier.

2. Description of Related Art

In some conventional disk files, the data storage disk is mounted horizontally for rotation about a vertical axis, and is mounted on a main body or chassis. The disk head, which may be a read-only head or a read-and-write head, is movably mounted on the main body of the disk file, for movement over the disk to desired tracks. Although in some circumstances the disk file may be permanently and rigidly fixed in the frame or other equipment, it often occurs that the disk file must be mounted so as to be easily removable from a supporting frame. For example, file server products put a number of hard disk drives (HDD) into a single cabinet to reach storage requirements.

In other arrangements the disk file may be mounted vertically for a rotation about a horizontal axis. In general in this specification, it is to be appreciated that the description of a disk file applies equally well to a disk file position in a vertical plane for rotation about a horizontal axis, or indeed another configurations where appropriate.

A problem which arises in operation of disk files occurs at the end of the seek movement of the actuator across the disk. The rotational energy created by an HDD actuator is high enough to move its own casting and create servo errors if it is not restrained, which also results in write inhibits, soft errors, and slow response time. This may be generally characterized as self-induced problems. In recent years the actuators on disk files have generally changed from linear to rotary operation, the read/write heads being moved in an arch across the disk, about a vertical axis (for a horizontal disk) position on the main body of the disk file, outside the perimeter of the disk.

The vibrations arising from acceleration and deceleration of such a rotary actuator produce rotary oscillation of the main body of the disk file in a horizontal plane. The axis acceleration and deceleration of the actuator, containing the read/write heads, particularly on high performance disk files, results in an equivalent reaction to the main body of the disk file. In addition, the hard disk drive creates vibration energy when the disk stack is out of balance. These vibration energies may be transmitted to adjacent drives. This transmitted vibration energy may result in write inhibits, soft errors, and slow response from the HDDs. This may generally be characterized as vibration transmission problems.

As more tracks are written per inch on HDD products, the severity of the problems will increase. Thus, future HDD products will require system cabinets and carriers which take these issues more into account.

The system cabinet construction and file mounting (or carrier) have a significant impact on the magnitude of these two problems. The vibration transmission problems can be resolved with a very soft, or isolation mount system. The self-induced problems can be solved with a very stiff or hard mount. Thus, trying to solve one of the problems may counteract attempts to solve the other problem, or even aggravate the other problem. To resolve both problems, the mounting system and cabinet must have a combination of stiffness and damping that restrain the file enough to minimize self-induced problems, yet do not transmit significant vibration energy from adjacent files.

Further, when the hard disk drives have mounting problems, the excessive write inhibits that are posted may result in a preventative action to replace the drive, when in reality the drive is fine, it is just a mounting problem.

It can be seen that there is a need for a device for a common carrier to absorb vibration transmissions from a disk drive file to other co-located disk drive files and to minimize self-induced vibration problems.

SUMMARY OF THE INVENTION

To overcome the limitations in the prior art described above, and to overcome other limitations that will become apparent upon reading and understanding the present specification, the present invention discloses a damping device for a common carrier.

The present invention solves the above-described problems by providing a damping device with a top element, a bottom element, and a viscoelastic element between the top and bottom elements. The damping device exerts significant shear displacement across the viscoelastic element upon deflecting.

In a preferred embodiment the damping device has first and second ends and an intermediate portion between the first and second ends. The damping device has a generally longitudinal extension with an elevation in the direction of the top element in the intermediate portion. The elevation has a substantially V-shaped when the damping device is unloaded.

A system in accordance with the principles of the present invention includes a system cabinet, a plurality of carriers mounted in the system cabinet for receiving hard disk drives, and a plurality of damping devices according to the invention mounted between the carriers and the system cabinet.

Other embodiments of a system in accordance with the principles of the invention may include alternative or optional additional aspects.

An advantage of a damping device according to the invention is that it overcomes both problems with self-induced vibration and problems with vibrations transmitted from other carriers in the system cabinet. A further advantage is that in using a system according to the invention, the vibration problems related to the mounting have been overcome, whereby functioning drives should no longer be replaced unnecessarily.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a laminated damping device for a common carrier.

Figure 1:
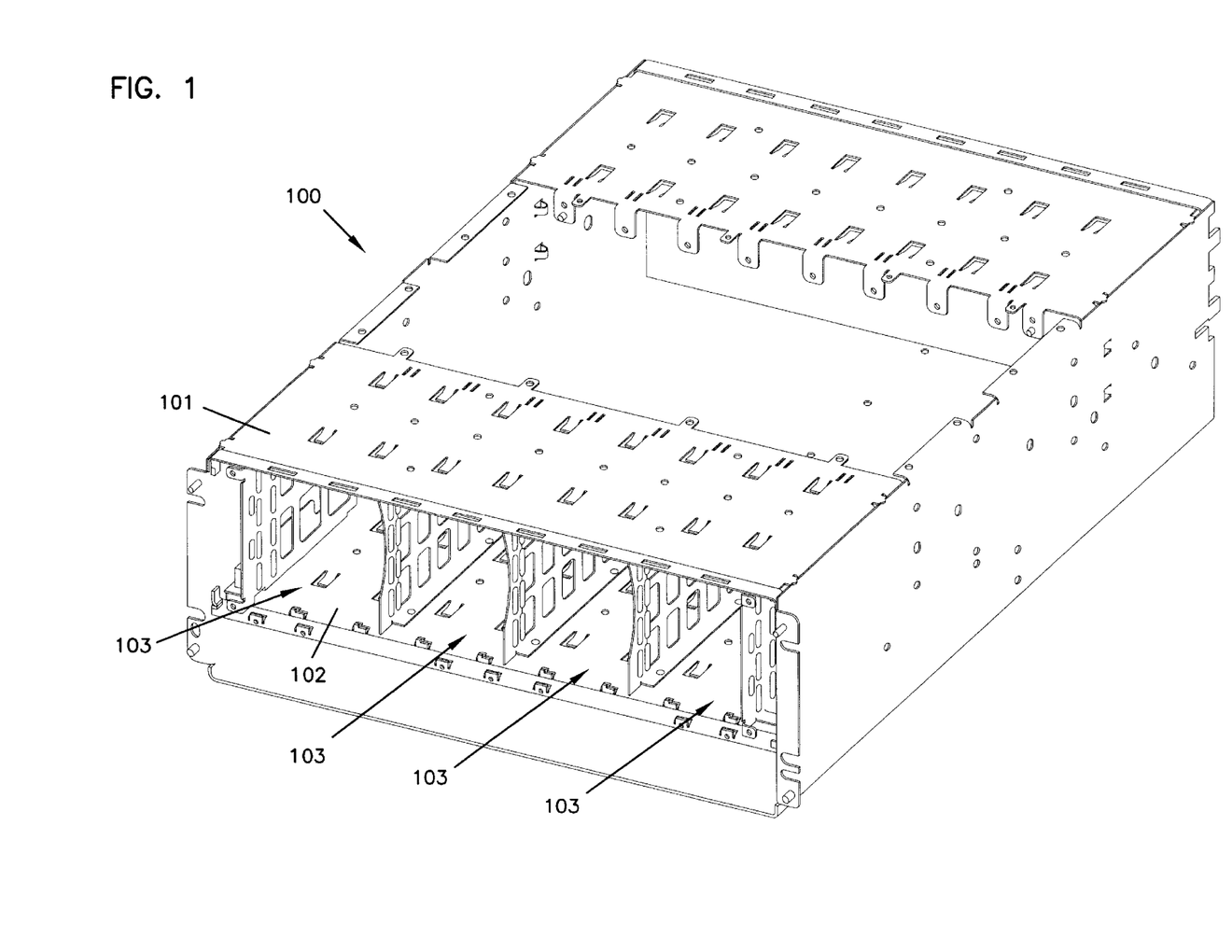
FIG. 1 illustrates a system cabinet.

FIG. 1 illustrates a chassis 100 of a system cabinet for mounting a plurality of hard disk drive systems therein. The chassis includes bays 103 for the hard disk drives. The bays 103 are partly confined by a top wall 101 and a bottom wall 102 of the chassis 100. The system cabinet is constructed to provide a stiff mounting platform. For example, the system cabinet may be made from 1.5 mm (or more) thick steel with stiffening ribs and features.

Figure 2:
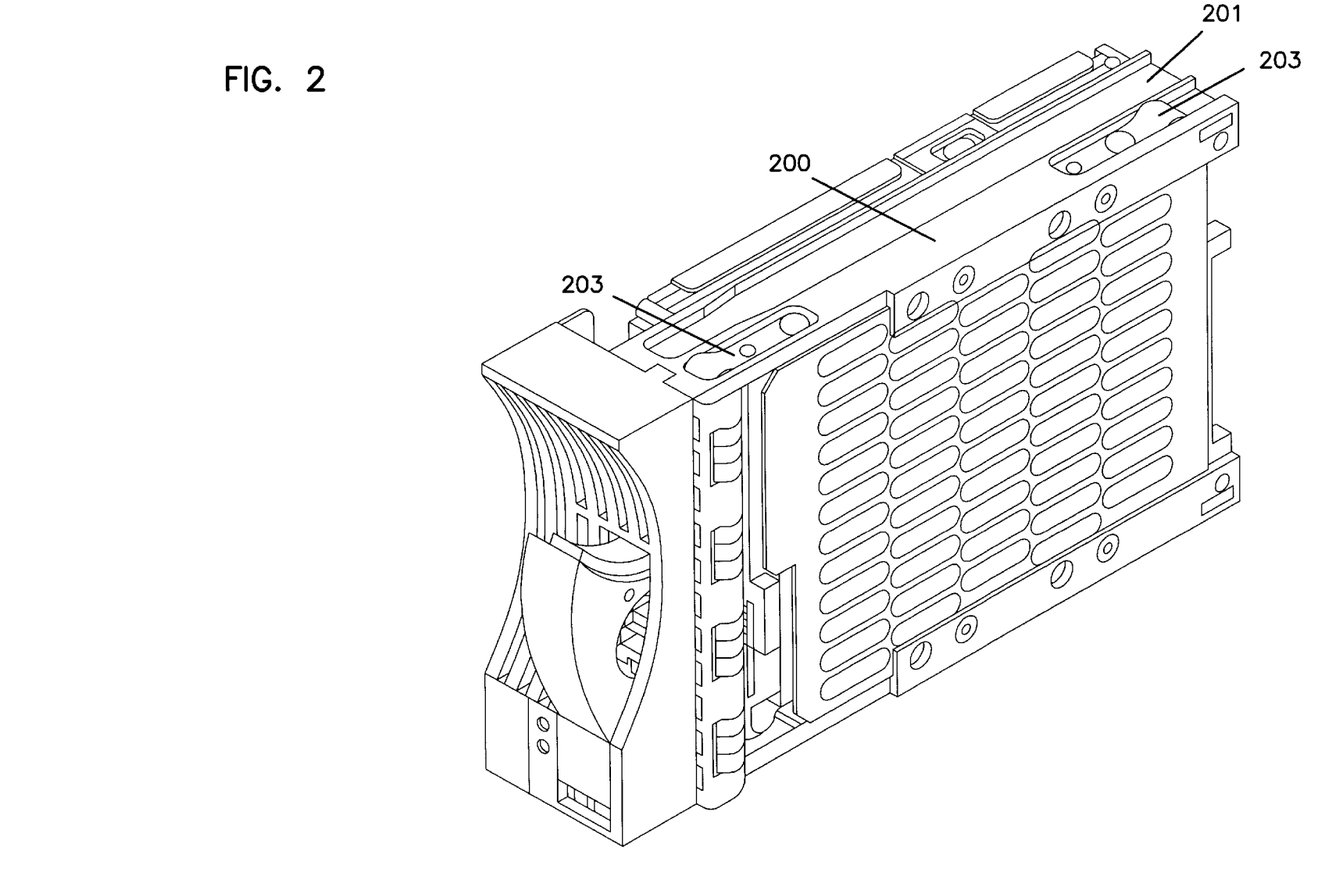
FIG. 2 illustrates a hard disk drive with a carrier mounted on it.

FIG. 2 illustrates a hard disk drive mounted within an enclosure or carrier 200. The carrier 200 is constructed from materials having high rigidity. For example, the carrier may be a rigid aluminum or zinc carrier. The carrier 200 is designed for insertion within one of the bays 103 illustrated in FIG. 1. The hard disk drive carrier includes guide rail slots 201 on two sides of the enclosure (only one of which is shown) for guiding the disk drive within the bay 103 of the chassis as the enclosure is slid therein. The carrier 200 further includes damping devices 203 adjacent to the guide slot 201. In FIG. 2, two damping devices 203 are shown with each guide rail 201. The damping devices are positioned and dimensioned such that at least part of the damping device will engage the chassis 100 when the carrier is inserted into bay 103, and to exert significant shear displacement upon deflecting.

Figure 3:
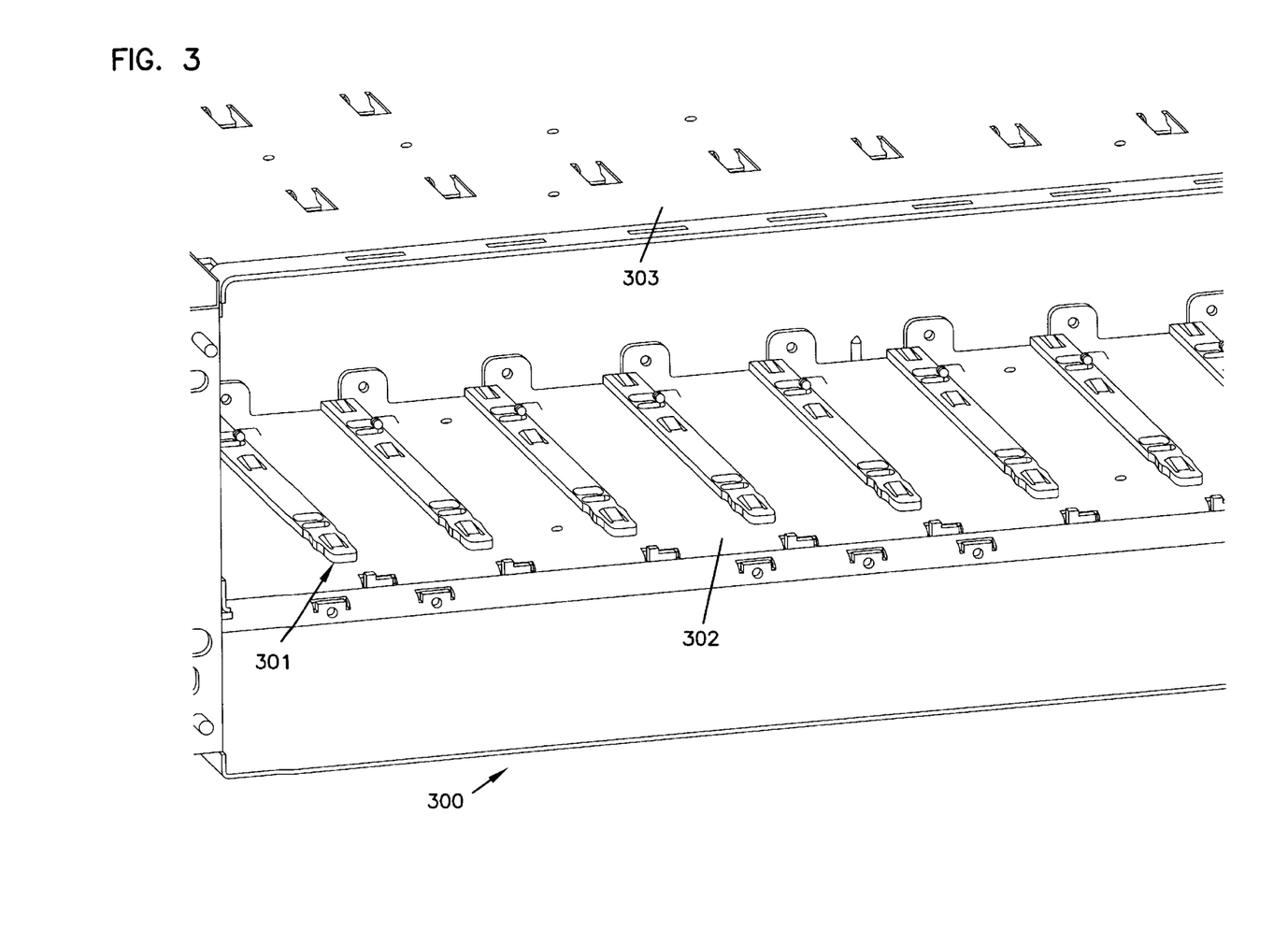
FIG. 3 illustrates the inside of a system cabinet, including guide rails.

FIG. 3 illustrates guide rails 301 disposed along the bottom wall 302 of a chassis 300. Although not visible in FIG. 3, guide rails 301 may also be disposed in a similar way along an inside of the top wall 303. The guide rails 301 mate with the guide rail slots 201 shown in FIG. 2 for guiding the disk drive within the chassis 300 when the hard disk drive enclosure 200 is inserted into the chassis. The carrier 200 containing the hard disk drive may slide into the chassis along the guide rail 301 and mate with a connector adjacent a distal end of the guide rail 301. The carrier 200 includes a damping device for engaging the chassis for securing the carrier and the hard disk drive within the chassis.

Figure 4:
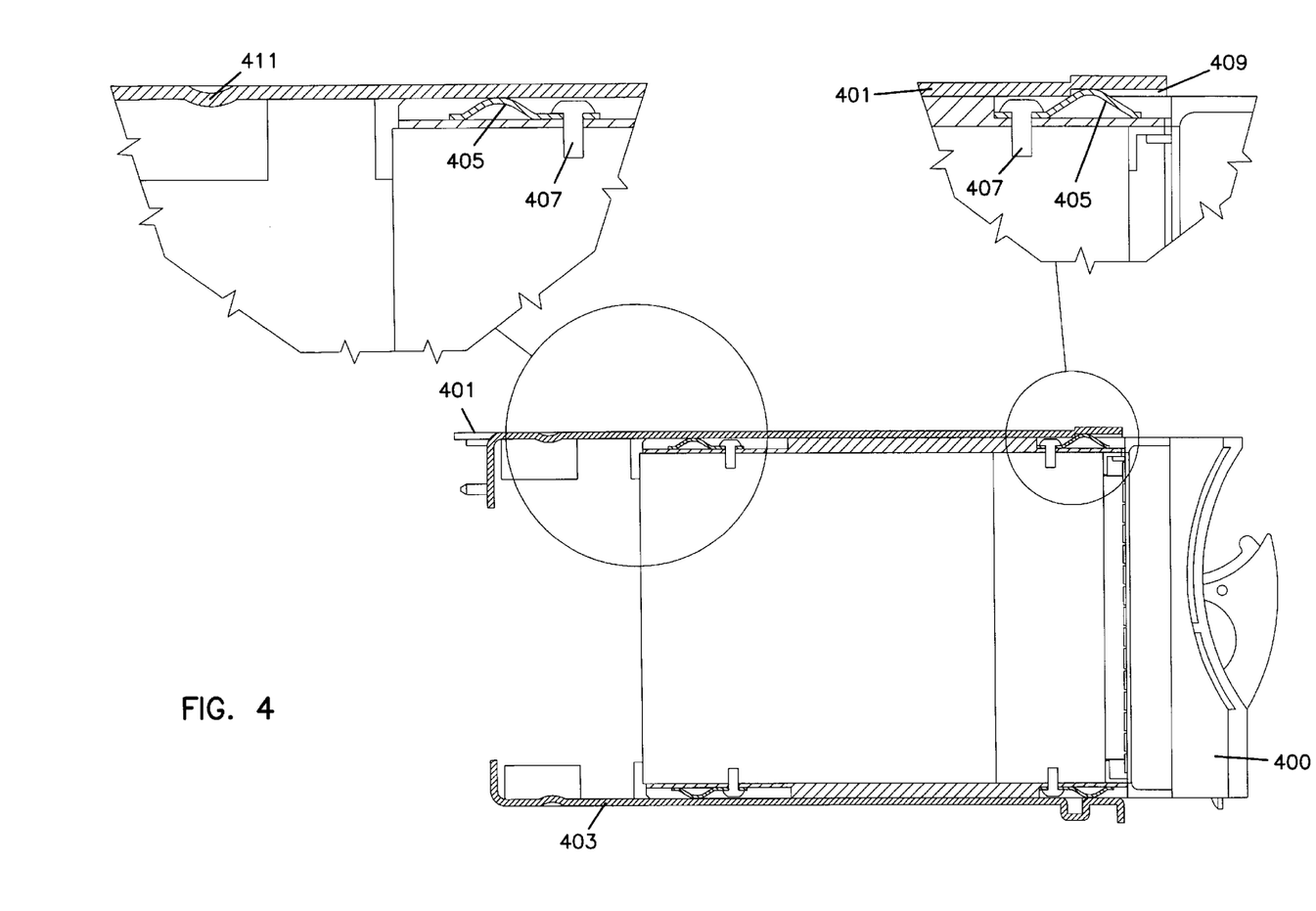
FIG. 4 is a side view of a system cabinet during the insertion of a carrier.
Figure 5:
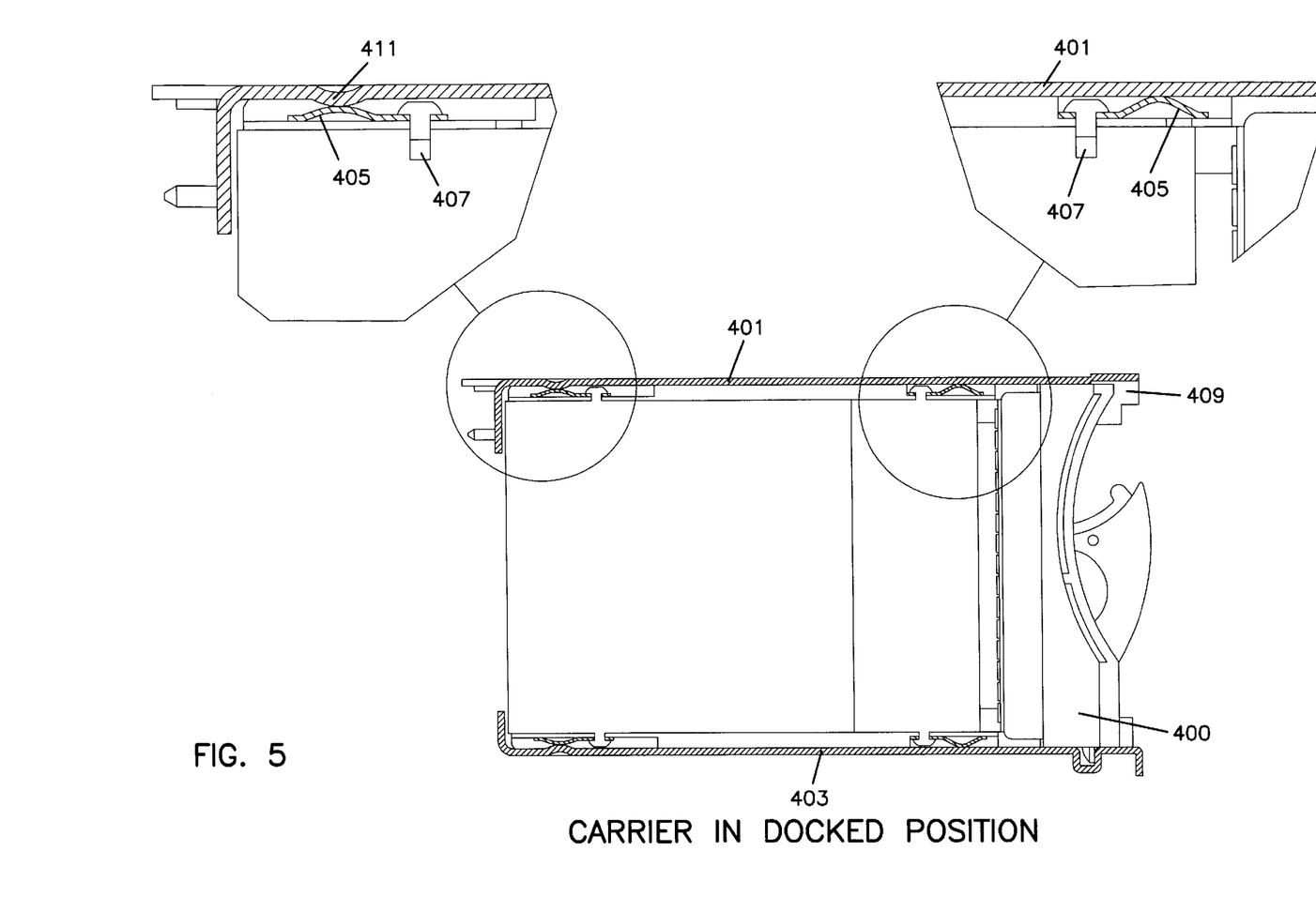
FIG. 5 is a side view of a system cabinet after the insertion of the carrier.

FIG. 4 is a side view of a carrier 400 including a hard disk drive being inserted into a chassis. A top wall 401 and a bottom wall 403 of the chassis are shown. The damping devices 405 may be mounted to the carrier 400 by bolts 407. The carrier is shown being inserted from right to left in FIG. 4, but it has not reached its final mounting position in the chassis. As shown in the enlarged cut-outs, one or more of the damping devices 405 may engage a recessed area 409 in the top or bottom walls 401 or 403 during the insertion, such that it rides up on the top or bottom wall 401 or 403 when the carrier is placed in its final position. One or more bumps 411 may be located in the top or bottom walls 401 or 403. When the carrier has been advanced to its final position, the damping device 405 engages the bump 411, for example as shown in FIG. 5. In its final position between the top and bottom walls 401 and 403 the carrier 400 engages the walls with at least part of the damping devices 405, which are mounted to the carrier 400 by for example bolts 407. One or more of the damping devices 405 may engage a bump 411 in the final position. The bump may provide a restraint against the carrier inadvertently moving out of the cabinet. During the insertion of the carrier, the engagement between the damping device 405 and the bump 411 may also indicate to the operator when the carrier has been fully inserted into the system cabinet.

When the carrier is in its final position, damping devices 405 engage the top and bottom walls 401 and 403 to provide damping of vibrations in the carrier and prevent vibrations in the chassis from transmitting to the carrier. The static force exerted by the damping device in the cabinet is about 6 pounds in this application.

Figure 6:
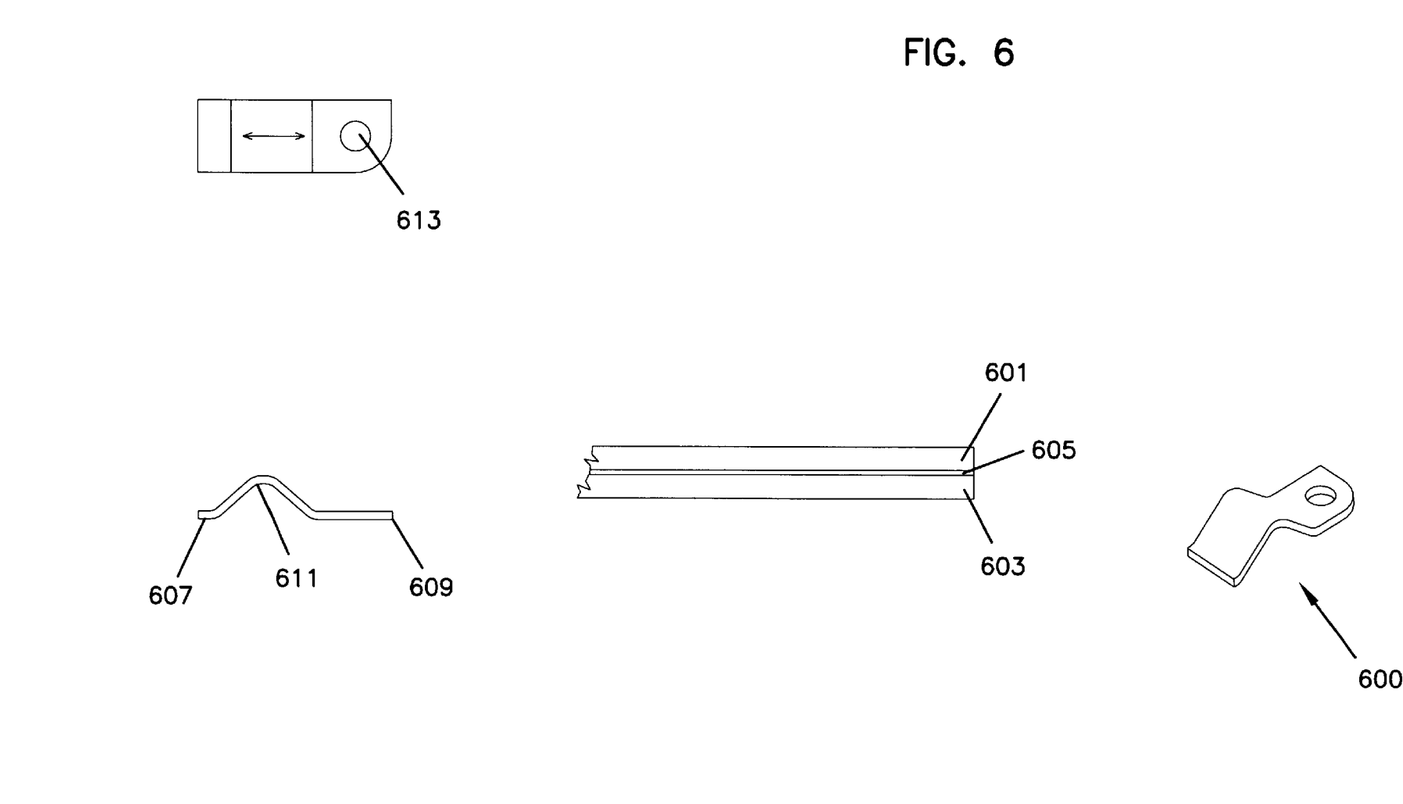
FIG. 6 illustrates a damping device according to the invention.

FIG. 6 illustrates a damping device 600 according to the present invention. The damping device may be disposed between a carrier and system cabinet, wherein the damping device is mounted to the carrier and has high damping characteristics. The damping device 600 generally consists of a top element 601, a bottom element 603, and a viscoelastic element 605 between the top and bottom elements. The top and bottom elements 601 and 603 may be formed from a number of different materials, such as metals, plastics and carbon fiber materials. For example, the top and bottom elements 601 and 603 may be formed from stainless steel. The viscoelastic element 605 is formed from a viscoelastic material. Simply stated, a viscoelastic material can be thought of as a device having properties somewhere between an elastic solid and a viscous fluid. In viscoelastic materials stress is generally a function of strain, strain rate, higher time derivatives of strain and time derivatives of stress. The relationship relating stress and its time derivatives to strain and its time derivatives is called a constitutive equation or rheological equation of state. For the damping device to deflect, the top and bottom elements exert significant shear displacement across the viscoelastic material, resulting in high damping. The viscoelastic element 605 may comprise a damping adhesive. For example, the viscoelastic element 605 may comprise ANATROL R980 Damping Adhesive.

The damping device in FIG. 6 includes a first end 607, a second end 609, and an intermediate portion 611 between the first and second ends. The damping device has a generally longitudinal extension and the intermediate portion 611 has an elevation in the direction towards the top element 601. The elevation in the intermediate portion has a substantially V-shaped when the damping device is unloaded. The dimensions of the elements of the damping device may be chosen in consideration of the application in which the device is to be used. Also, the size and in particular the height of the elevation of the intermediate portion 611 may be chosen to provide the desired damping. Elevation heights of 3.6 and 4.5 mm when unloaded are suitable for some intended applications. The elevation may be located closer to the first end 607 than to the second end 609, but may be located differently in other applications. The damping device 600 may be provided with one or more openings 613 for mounting the damping device using a bolt or other mounting means.

Figure 7:
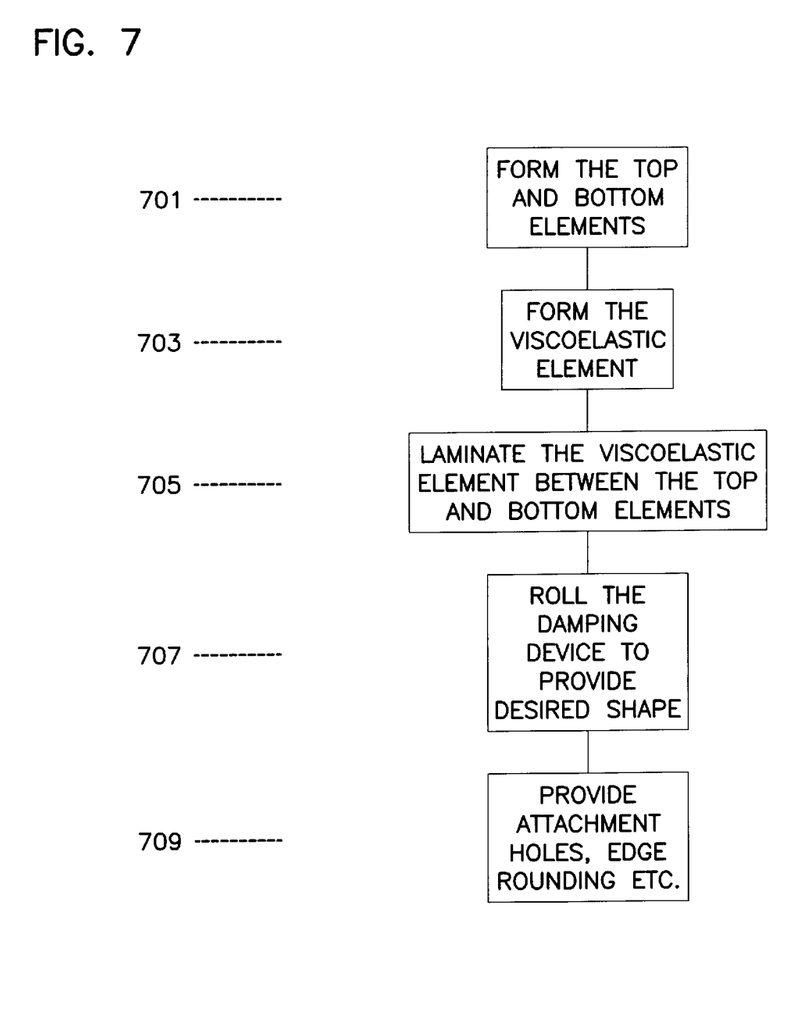
FIG. 7 is a flow chart for manufacturing a device according to the invention.

FIG. 7 is a flow chart schematically illustrating a method of manufacturing a damping device according to the invention. In step 701 the top and bottom elements are formed. Although the final damping device may have an elevated configuration, the elements are typically formed with a flat configuration before assembly. As noted above, the top and bottom elements may be stainless steel, and the elements may be formed from a sheet of stainless steel using well-known techniques. The top and bottom elements are generally formed with the same shape.

In step 703 the viscoelastic element is formed. The material for the viscoelastic element may be provided in form of a sheet, from which the viscoelastic element is formed. The viscoelastic element is laminated between the top and bottom elements in step 705. The viscoelastic element may adhere to the top and bottom elements and provide a damping device with sufficient structural integrity. Alternatively, an adhesive may be applied to the contacting surfaces in step 705 to facilitate lamination.

The initially flat damping device is rolled in step 707 to provide it with a desired shape. For example, the damping device may be provided with the substantially triangular knee-shape as illustrated in FIG. 6. The damping device may be rolled to a desired shape using well-known techniques. For example, the initially flat damping device may be positioned over an anvil having the desired shape, and a heavy roll may be rolled along the damping device to bias it against the anvil whereby the damping element assumes the desired shape.

The method of manufacturing may continue in step 709 with providing attachment openings in the damping device, rounding off the edges etc.

Figure 8:
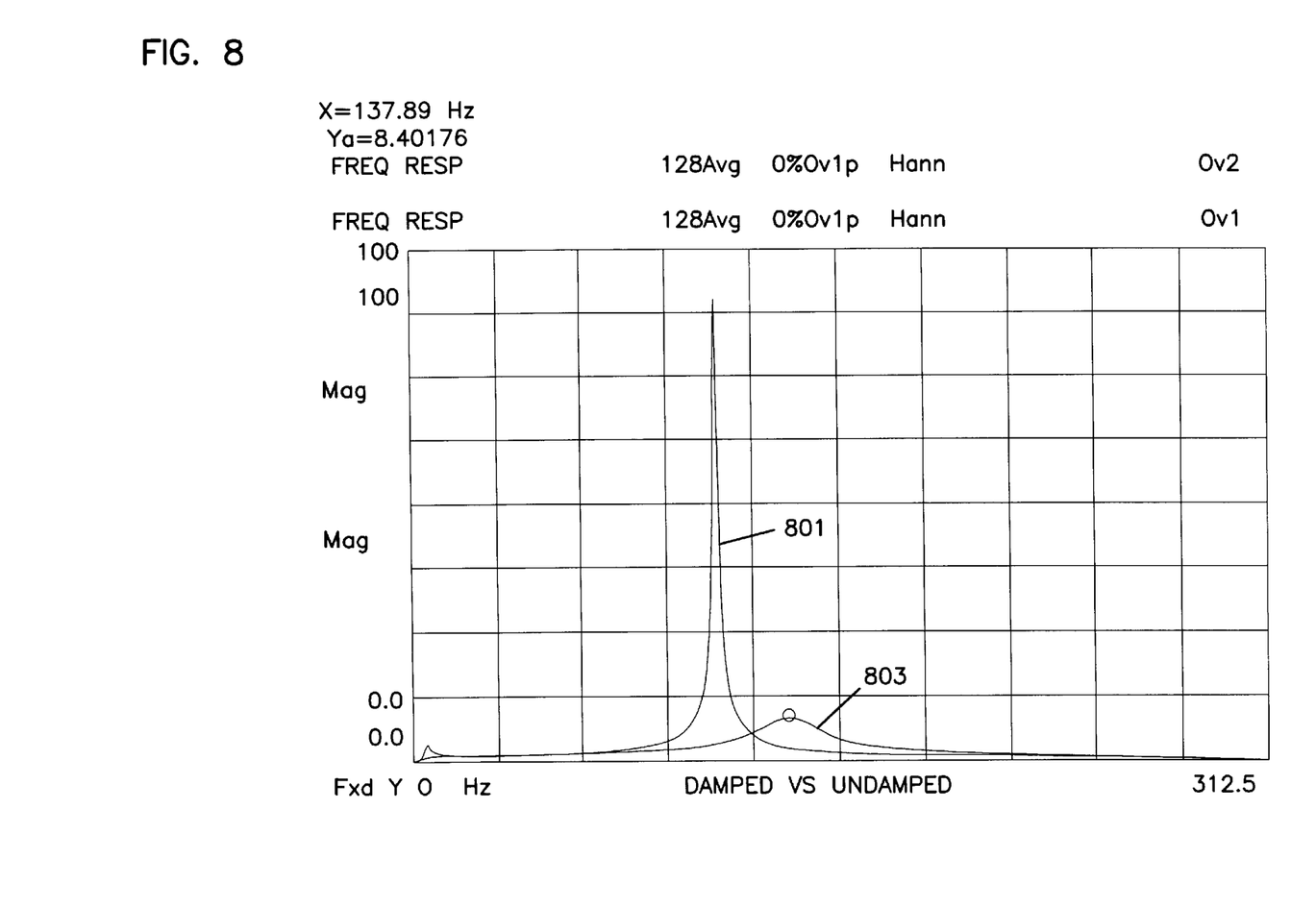
FIG. 8 is a frequency response diagram from an exemplary damping measurement.

Two examples of experimental data for an embodiment of the device according to the invention will be given. The first experiment relates to the damping of two steel members with and without a damping adhesive in between. The two stainless steel members were sized 0.5"×2.0" and had a thickness of 0.02". Initially, the steel members were clamped together at each end with bolts. One end was attached to a shaker which produced random vibrations from 0–300 Hz. Accelerometers were connected to both the cantilevered end and the shaker end, and an FFT (Fast Fourier Transform) analyzer was used to measure the transfer function between the accelerometers. To form the damped spring, a viscoelastic adhesive ANATROL R980 was placed between the steel members which were then clamped together, and measurements were taken as above. Frequency response graphs of the resulting data are shown in the diagram in FIG. 8, where the horizontal axis is the frequency and the vertical axis is a linear scale of magnitude. Graph 801 represents the frequency response of the undamped spring. A large-magnitude resonance occurs at about 111 Hz. Graph 803 represents the frequency response of the damped spring. The resonance occurs at a higher frequency and has decreased significantly in magnitude. Some characteristics of the measurements are also given in Table 1 below.

TABLE 1

|  | Frequency | Magnitude | Percent of Critical Damping |
|---|---|---|---|
| Undamped members | 111.3 Hz | 39.1 dB | 0.7% |
| Damped members | 137.9 Hz | 18.5 dB | 7.7% |

The damping in percent of the critical damping as given in Table 1 above was calculated from the transfer function measured by the FFT analyzer. A significant damping (of the order of 20 dB, or a factor 10) was obtained by using the viscoelastic adhesive in this experiment.

The second example of experimental data for an embodiment of the device relates to off-track performance of the file, which is a measurement of how accurately the head traces the tracks of the disk. The off-track performance was measured for a file using first a solid (undamped) spring and then a damped spring according to the invention. The solid spring had approximately the same stiffness as the damped spring. The results of the measurement are shown in Table 2 below.

TABLE 2

|  | NRRO Degradation (External Vibration) | Head Settle Degradation (Self Induced) |
|---|---|---|
| Solid Spring | 0.31 $\mu$IN | 0.27 $\mu$IN |
| Damped Spring | 0.19 $\mu$IN | 0.16 $\mu$IN |

The measurements presented in Table 2 are the standard deviations (sigma) of the instantaneous head dislocations in microinches ($\mu$IN). The NRRO degradation is essentially what was characterized as "vibration transmission problems" in the background of the invention above. It can be measured for example as the sigma obtained during a test sequence when the current head is positioned on a particular track. The head settle degradation is essentially what was characterized as "self-induced problems" in the background of the invention above. It can be measured for example as the sigma obtained during a test sequence while the file is carrying out a seek pattern. The data in Table 2 show that the off-track performance was significantly improved with the damped spring in this experiment, both regarding self-induced and externally originated degradation.

A low production cost for the damping device is achieved by laminating two stainless steel springs together with a viscoelastic material. The top and bottom elements of the damping device exert significant shear displacement across the viscoelastic element upon deflecting. There are two valuable aspects to the design of the damping device. The stiffness and damping is selected to provide a good mechanical operating environment for the drive. While the addition of some stiffness and damping to designs may achieve improved performance, the laminated damping device provides lower cost, higher performance, and allows for more manufacturing tolerances in the cabinet construction.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for accommodating hard disk drives comprising:

a system cabinet;

a plurality of carriers mounted in the system cabinet for receiving hard disk drives; and a plurality of damping devices mounted between the carriers and the system cabinet, each damping device being cantilevered and comprising a top element, a bottom element, and a viscoelastic element between the top and bottom elements, wherein the cantilevered segments of the top element, the bottom element and the viscoelastic element are angled to collectively form an angled segment not within a securing plane of the damping device when the damping device is unloaded, and wherein the damping device exerts significant shear displacement across the viscoelastic element upon deflecting.

2. The system of claim 1, further including guide rails on the system cabinet and guide rail slots on the carrier, wherein the guide rails engage with the guide rail slots to guide the carrier when it is inserted into the system cabinet.

3. The system of claim 2, wherein the damping devices are mounted adjacent the guide rail slots.

4. The damping device of claim 1, wherein the damping device comprises a first end, a second end, and an intermediate portion between the first and second ends, wherein the damping device has a generally longitudinal extension with an elevation in the direction of the top element to form the substantially V-shaped portion in the intermediate portion.

5. The system of claim 4, wherein two damping devices are mounted on one side of the carrier and two damping devices are mounted on an opposite side of the carrier.

6. A damping device comprising:

a top element;

a bottom element;

a viscoelastic element disposed between the top and bottom elements to collectively form a device body, wherein the device body includes at least a substantially planar portion and a protruding portion forming an obtuse angle with the substantially planar portion when the protruding portion is not under load; and wherein the damping device exerts significant shear displacement across the viscoelastic element when the protruding portion is under load, and wherein the device body is coupled between a disk drive carrier and a system chassis to providing vibration damping between the disk drive carrier and the system chassis.

7. The damping device of claim 6, wherein the protruding portion comprises a portion of the device body shaped to form a two-segment acute angle, wherein one of the segments of the two-segment acute angle is coupled to the substantially planar portion of the device body to form the obtuse angle.

* * * * *

UNITED STATES PATENT AND TRADEMARK OFFICE
CERTIFICATE OF CORRECTION

PATENT NO.    : 6,209,842 B1  
DATED         : April 3, 2001  
INVENTOR(S)   : Anderson, Connelly and Green It is certified that error appears in the above-identified patent and that said Letters Patent is hereby corrected as shown below:

Column 5,
Lines 22-23, please replace "triangular knee-shaped" with -- V shaped --.

Column 7,
Please delete the existing claim 4 and replace it with -- The system of claim 1, wherein four damping devices are mounted on the carrier. --

Signed and Sealed this

Twenty-seventh Day of May, 2003

JAMES E. ROGAN
*Director of the United States Patent and Trademark Office*